United States Patent [19]

Steffens

[11] 4,303,501

[45] Dec. 1, 1981

[54] PROCESS FOR THE CONTINUOUS SEPARATION OF DISCARDED HYGIENE ARTICLES INTO THEIR COMPONENTS

[76] Inventor: Bert Steffens, Aufader Jaugel 5, D-5470 Andernach 13, Fed. Rep. of Germany

[21] Appl. No.: 82,925

[22] Filed: Oct. 9, 1979

[30] Foreign Application Priority Data

May 7, 1979 [DE] Fed. Rep. of Germany ....... 2918345

[51] Int. Cl.³ ...................... B07B 15/00; D01G 11/04
[52] U.S. Cl. ............................................ 209/2; 209/3; 209/12; 209/129; 209/315; 162/4; 241/24
[58] Field of Search ................ 209/2 B, 311, 313–316, 209/12, 127 R, 129 R, 129; 162/4, 55; 241/28, 24

[56] References Cited

U.S. PATENT DOCUMENTS

| | | | |
|---|---|---|---|
| 1,314,135 | 8/1919 | Falker | 209/315 X |
| 3,890,220 | 6/1975 | Anderson | 209/3 |
| 4,092,241 | 5/1978 | Mackenzie et al. | 209/3 X |

FOREIGN PATENT DOCUMENTS

| | | | |
|---|---|---|---|
| 2426742 | 12/1975 | Fed. Rep. of Germany | 19/200 |
| 2703063 | 7/1978 | Fed. Rep. of Germany | |
| 2704035 | 8/1978 | Fed. Rep. of Germany | 162/4 |
| 26802 | of 1913 | United Kingdom | 209/129 |
| 1442941 | 7/1976 | United Kingdom | 209/12 |

*Primary Examiner*—Ralph J. Hill
*Attorney, Agent, or Firm*—Cushman, Darby & Cushman

[57] ABSTRACT

There is provided a process for the continuous separation of discarded hygiene articles into their components, namely flock and/or cut absorbent materials on the one hand and sheet coverings on the other comprising first tearing the discarded hygiene articles into large pieces and then conducting the pieces over an oscillating sieve surface, preferably over an oscillating sieve device having decreasing mesh widths with the smallest mesh width being so selected that the flocculent and/or cut absorbent material still can fall through while the large pieces of torn covering are always carried off as sieve residues.

3 Claims, No Drawings

PROCESS FOR THE CONTINUOUS SEPARATION OF DISCARDED HYGIENE ARTICLES INTO THEIR COMPONENTS

BACKGROUND OF THE INVENTION

The invention is directed to a process for the continuous separation of discarded hygiene articles into their components, namely flocculent and/or cut absorbent material on the one hand and sheet coverings on the other.

In the production of hygiene articles for one time use, the so-called discardable or single use hygiene, articles such as diapers, sanitary napkins, sick bed linings or the like there always occur a certain proportion of defective goods. This so-called scrap as a rule is unmarketable and increases the cost of production since it results in the lost of ultimately valuable raw material.

In view of the overall scarcity and above all, increase in expense of raw materials it is of considerable importance to recover scrap material. This is also true for hygiene articles of the type mentioned whose absorbent material for the most part consists of flocculent cellulose and whose covering or coverings for the most part consist of (synthetic resin) film and fleeces. For a reworking these must with the finished hygiene article, including the scrap goods, next be separated to a unit of combined components.

There has already been proposed by the applicant a process and an apparatus for this purpose, see German OS No. 27 03 063. The process consists of conveying the hygiene article discontinuously into the entrance area with carriers rotating at high peripheral speed, whereby the covering synthetic resin films are torn off and unwound and enclosed cellulose set free and drawn off with suction and subsequently the synthetic resin films are dissolved with cutting up of the carriers and are separately drawn off with suction.

Accordingly, to the known process, however, it is only possible to work discontinuously which does not permit the throughput of large amounts per unit of time. Furthermore, the sheet coverings must be further cut up before they again can be free and can be removed. Naturally this means a proportionately high mechanical expense.

This is the starting point for the invention. It is based on the problem of developing a process which permits the continuous separation of discarded hygiene articles into their components, namely flocculent and/or cut absorbent materials on the one hand and sheet coverings on the other. Thereby the process should permit a high throughput without too great a mechanical expense.

SUMMARY OF THE INVENTION

This problem is solved according to the proposal of the invention in a surprisingly simple manner by first tearing the discarded hygiene article into large pieces and then conducting them over an oscillating sieve surface, preferably over an oscillating sieve device with decreasing mesh widths with the smallest mesh width being so selected that the flocculent and/or cut absorbent material still can fall through while the large pieces of torn covering are always carried off as sieve residue.

The tearing in each case need only take place until the absorbent material falls out of the sheet coverings. The mechanical expense for this can be held proportionately low. Suitable tools or apparatus for the tearing for example are so-called bale breakers or bale tearers such as are employed for breaking up cotton balls in spinning mill operations.

The true separation takes place subsequently with the help of known oscillating sieves (or screens) wherein the flocculent material is finally recovered in each case as screen undersize and the coverings in each case recovered as sieve residue. This process step can be accomplished in many variations. In the simplest case a simple oscillating sieve is sufficient. Suitably the transportation of the sieve goods is effective over the oscillating sieve surface by the oscillating sieve itself which for this purpose can be inclined particularly in the transportation direction.

The sharpness of separation increases first with the length of the oscillating sieve, however, above all can be increased by using an oscillating sieve device with decreasing mesh widths. For this purpose several oscillating sieves can be arranged in succession and the sieve undersize in each case again be led to the subsequent oscillating sieve via a chute, slide, a conveying belt, etc, while the sieve residue in each case is immediately separated and removed in common.

Especially simple and advantageous is an oscillating sieve device with several oscillating sieves arranged one above the other. Thereby the sieve undersize without further help in each case goes to the next smaller oscillating sieve where a further separation occurs into absorbent material and coverings.

The sieve residue of each sieving step is always collected on the sieve surface until it goes over a wall of the oscillating sieve and can fall downwardly where it can be collected in a chute, slide, on a conveyor belt, etc. and removed. With the sieve residues in each case it is a matter of formerly sheet covering which, according to the degree of comminution, earlier or later accumulate as sieve residue, i.e. the smaller the coverings are torn the more frequently they can still pass through individual oscillating sieves with the absorbent material and the later they form a sieve residue. Thereby the smallest mesh width is so chosen that finally only absorbent material can fall through.

Finally the process can also be carried out advantageously with oscillating sieves whose mesh widths continuously decrease within the same oscillating sieve.

As a result the invention permits the use of a continuous stream of material so that a higher throughput is attained. The mechanical expense needed is proportionately small since for the true separation there are essentially needed only large surface oscillating sieves worth the price. Compared with the above mentioned known discontinuous process besides there can be eliminated the inclusion of compressed air conveyor systems as well as an air deposition with filtration. Through this there is saved a considerable expense, furthermore, the development of noise is lower.

According to a further proposal of the invention a fine separation is also possible in which even the portion of formerly sheet coverings still are separated which are torn so exceptionally small that they are able up to the final to pass through the screen area together with the absorbent material. The process consists of leading the flocculent and/or cut absorbent material together with any remaining residual covering after the sieves past on an electrostatically loaded surface, preferably of a conveyor belt.

The process uses known electrostatic effects whereby there is assumed components with different dielectric constants. This assumption with the hygiene articles of interest here in general is true.

The sharpness of separation can be further increased by simultaneously disintegrating the material stream with approach to the electrostatically charged surface which for a conveyor belt means that this should be carried out in addition to a linear motion with a crushing motion.

Below there is described a preferred example of the invention and the invention will be further explained therethrough.

The process can comprise, consist essentially of or consist of the steps set forth.

DESCRIPTION OF THE PREFERRED EMBODIMENTS

The scrap from the discardable disposable hygiene articles is first supplied to a bale tearer and torn therein into large pieces. Next the mixture of absorbent material and coverings is fed by means of a conveyor belt to the first, i.e., uppermost oscillating sieve (screen) of a multistage oscillating sieve device. Below this oscillating sieve there are located further oscillating sieves with successively decreasing mesh widths.

Dependent on the motion of the oscillating sieve the material stream migrates over the sieve surface of the oscillating sieve whereby the sieve residue in each case at the end of an oscillating sieve goes beyond its wall and then was caught and removed. This was continued from stage to stage until after the last oscillating sieve there only remained available as sieve undersize flocculent and/or cut absorbent material without its sheet coverings and this was removed.

The oscillating motion of each individual oscillating sieve as well as its length and mesh widths are so laid out that always only sheet coverings go over the wall at the end of each oscillating sieve, i.e. substantially freed from flocculent and/or cut absorbent material. The coverings are carried away by means of conveyor belts and pressed by means of known process to transport bales for a further processing. The flocculent and/or cut absorbent material in contrast can be again supplied directly to the production process for new discardable hygiene articles.

What is claimed is:

1. A process for the continuous separation of discarded hygiene articles made of (1) flock, cut or mixed flock and cut absorbent materials and (2) sheet covering for said absorbent material comprising first tearing the discarded hygiene articles into large pieces and then conducting the pieces over a plurality of superposed oscillating sieves having successively decreasing mesh widths with the sieve having the smallest mesh width being lowermost with the remaining sieves being positioned thereabove in the order of increasing distance between the meshes, the smallest mesh width being so selected that the absorbent material will pass through the sieve and the torn covering will remain as a sieve residue, passing the absorbent material through the sieves, collecting the large pieces of torn coverings as sieve residue and removing said collected pieces.

2. The process of claim 1 wherein there are employed at least 3 sieves in succession vertically.

3. The process of claim 2 wherein the absorbent material together with any covering which has passed through a sieve is then placed on an electrostatically charged surface.

* * * * *